Sept. 6, 1949.　　　　　　　　J. H. EGY　　　　　　　2,480,841
CONSTANT OR VARIABLE SPEED DRIVE
Filed April 10, 1946　　　　　　　　　　　　　3 Sheets-Sheet 1

INVENTOR.
Joseph H. Egy
BY [signature] and
Frederick W. Cotterman
Att'ys

INVENTOR.
Joseph H. Egy

Sept. 6, 1949.  J. H. EGY  2,480,841
CONSTANT OR VARIABLE SPEED DRIVE
Filed April 10, 1946  3 Sheets-Sheet 3
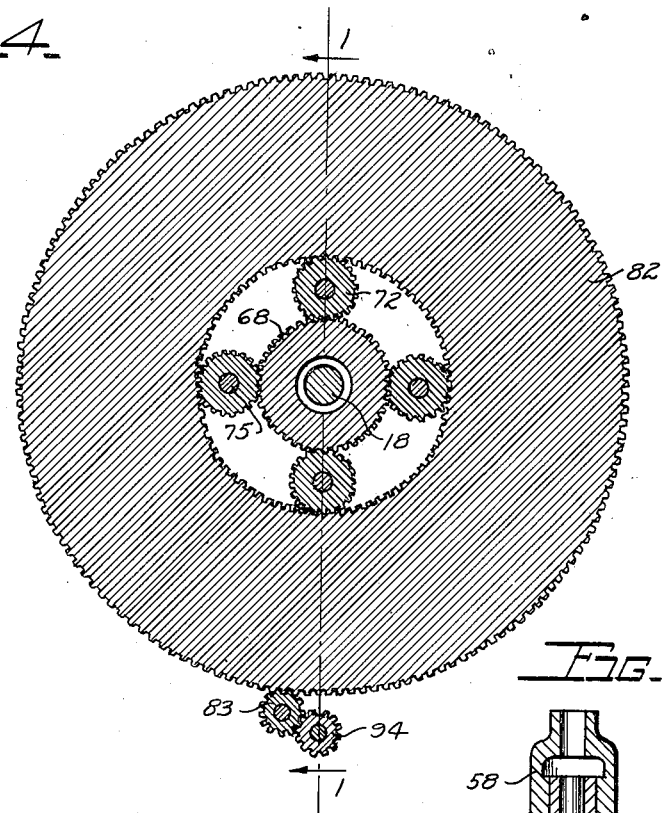
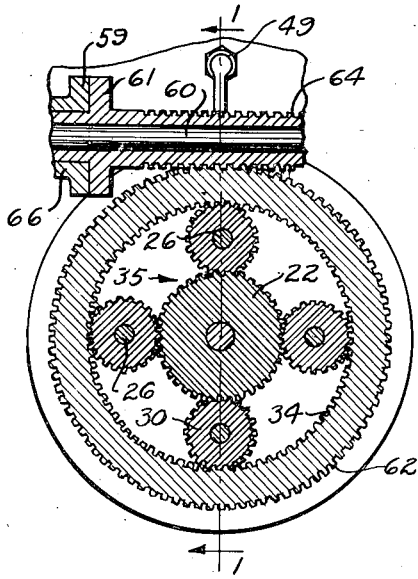
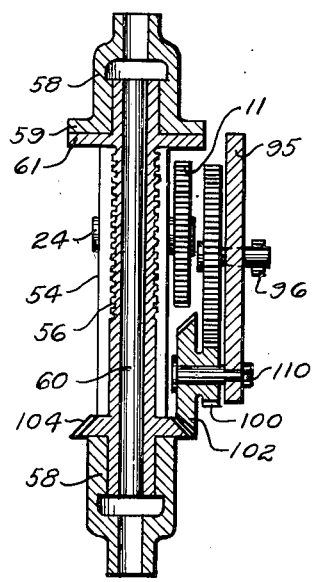
INVENTOR.
Joseph H. Egy
BY Clada Koontz and
Frederick W. Coterman
Att'ys Patented Sept. 6, 1949

2,480,841

UNITED STATES PATENT OFFICE 2,480,841

CONSTANT OR VARIABLE-SPEED DRIVE

Joseph H. Egy, Springfield, Ohio

Application April 10, 1946, Serial No. 661,036

14 Claims. (Cl. 74—675)

(Granted under the act of March 3, 1883, as amended April 30, 1928; 370 O. G. 757)

The invention described herein may be manufactured and used by or for the Government for governmental purposes without payment to me of any royalty thereon.

This invention relates to geared power transmitting drives, particularly to a drive wherein a variable speed input produces a constant speed output and vice versa, or where both input and output may be independently varied.

An object of the invention is to provide a drive wherein the power is transmitted wholly by gearing, but so arranged as to change ratio gradually from one ratio to another ratio.

Another object is to provide a variable ratio gear mechanism wherein gear connection between the driving and the driven member is made through one of a series of gear trains which are of different ratios, but so arranged that driving connection may be completed through a gear train of a second ratio before driving connection is broken through a gear train of the first ratio.

Another object is to provide a gear drive mechanism wherein there is a control motor, and means to cause the driven member to maintain a given speed ratio with respect to the control motor while the driving member may vary from a given speed to several times the given speed.

Another object is to provide a mechanism which includes a plurality of gear sets, each of a lower ratio than the next, and each capable of being changed by infinitesimal increment from its normal ratio to the normal ratio of the next higher gear set.

Another object is to provide an infinitely variable ratio changing gear mechanism having an input and an output member, one of which is constant and the other variable over a preselected speed range, the mechanism comprising several gear sets each of which transmits the power over a given part of the required speed range.

Another object is to provide a gear mechanism which includes an input member, an output member, and a control motor, wherein the input member may vary over a wide range of speeds while the output member speed remains a function of the control motor speed irrespective of the speed of the input member.

Figure 1:
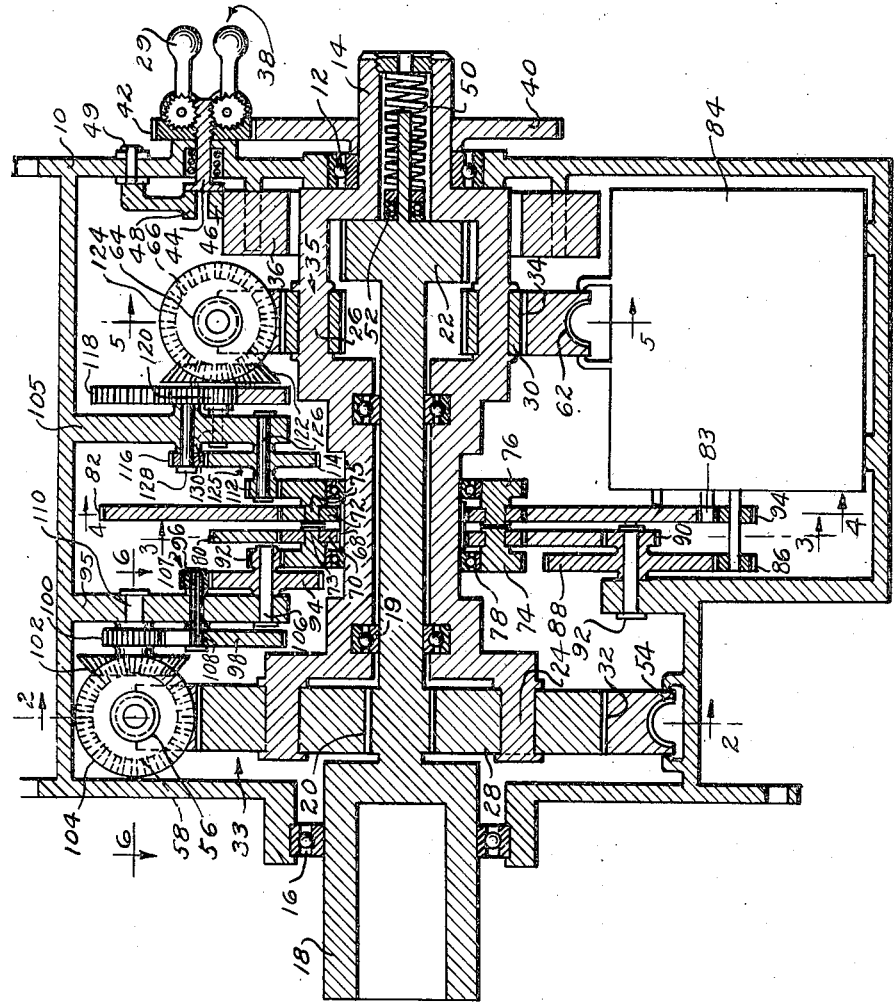
Figure 2:
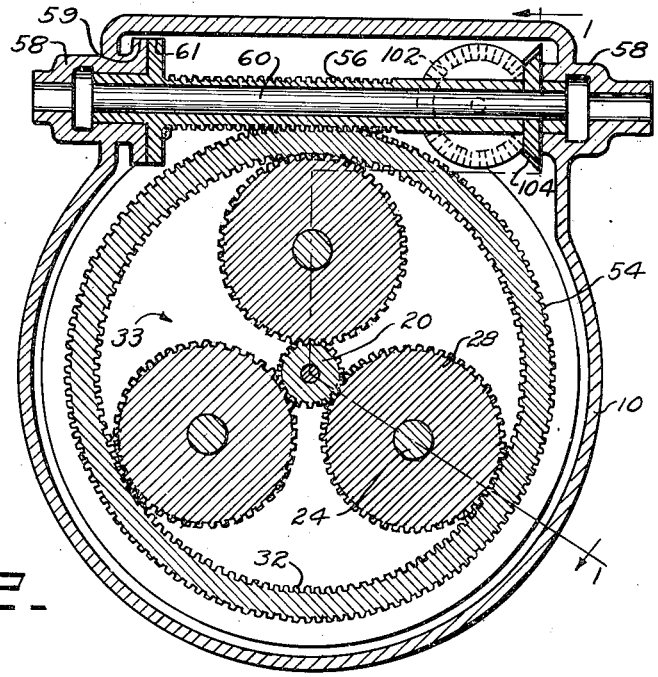
Figure 3:
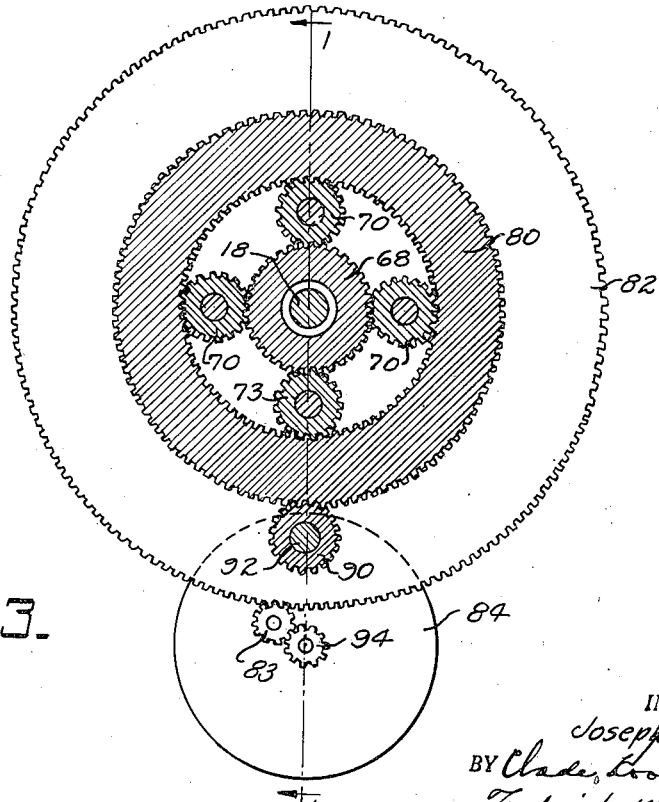

Other objects and meritorious features will be apparent upon consideration of the following description taken in conjunction with the drawings wherein:

Fig. 1 is a more or less schematic representation of an embodiment of the invention in longitudinal axial section, the section being taken on the line 1—1 of Figs. 2 through 5.

Figs. 2, 3, 4, and 5 are transverse sections through the gearing taken respectively at 2—2, 3—3, 4—4, and 5—5 of Fig. 1.

Fig. 6 is a fragmentary section through one of the worm wheels showing its cooling means.

Like reference characters refer to like parts throughout the several views.

Referring now to the drawings, a housing 10 at one end carries a bearing 12 for the input member 14 and at the other end a bearing 16 for the output member 18. Bearings 19 maintain rotary concentricity between the input member 14 and the output member 18. The output member 18 carries an integral sun pinion 20 and an integral sun gear 22. The input member 14 carries one set of integral planet shafts 24 and another set of integral planet shafts 26.

Planet gears 28 are freely rotatable on the planet shafts 24, and planet pinions 30 are freely rotatable on the planet shafts 26. An internally toothed ring gear 32 encircles the planet gears 28 and is in mesh therewith. An internally toothed ring gear 34 encircles the planet pinions 30 and is in mesh therewith.

The planetary gear set which includes the sun pinion 20, planet shafts 24, planet gears 28, and ring gear 32 may collectively be designated by the numeral 33 and may be referred to as the low speed gear set, while the planetary gear set which includes the sun gear 22, planet shafts 26, planet pinions 30 and ring gear 34 may collectively be designated by the numeral 35 and may be referred to as the high-speed gear set.

In the embodiment of the invention herein shown for purposes of illustration, the sun pinion 20 of the low-speed gear set has twenty teeth and the ring gear 32 has 130 teeth, while the sun gear 22 of the high-speed gear set has forty teeth and the ring gear 34 has eighty teeth. When the ring gear of one of the sets is held nonrotative, the driver-to-driven ratio will be $$1 \text{ rev. of driver} = \frac{R+S}{S} \text{ revs. of driven}$$

wherein R=number of teeth of the ring gear and S the number of teeth of the sun gear.

It follows that where the ring gear 32 of the low-speed gear set is held nonrotative, the ratio of the low-speed gear set will be $$\frac{130+20}{20} = 7\frac{1}{2} \text{ to } 1$$

i. e., one turn of the driving member 14 will cause 7½ turns of the driven member 18, and when the ring gear 34 of the high-speed gear set is held nonrotative, the ratio of the high-speed gear set will be $$\frac{80+40}{40} = 3 \text{ to } 1$$

i. e., one turn of the driving member 14 will cause three turns of the driven member 18.

The output member 18 is slidable axially in the inner race of the bearing 16, and the sun pinion 20 and sun gear 22 on the output member are so spaced with respect to the planet gears 28 and planet pinions 30 that, when one sun gear or pinion is withdrawn axially until it is wholly out of mesh with its planet gears, the other sun gear or pinion will be wholly in mesh with its planet gears and vice versa.

An electromagnet 36 is adapted, when energized, to shift the output member 18 with its pinion 20 and gear 22 to the right, whereby the sun pinion 20 is meshed with the planet gears 28 for low-speed ratio and the sun gear 22 is withdrawn from the planet pinions 30 as shown (see Fig. 1).

A centrifugal governor 38 is driven by a gear 40 which is fixed on the input member 14 and is in mesh with a gear 42 on the governor. When the mechanism is at rest or at low-speed, the governor engages a governor contact member 44 with a coil contact member 46 and a terminal contact member 48, thereby completing an electric circuit to a terminal 49 which is provided for connection to a power source, thus holding the sun pinion 20 of the low-speed planetary gear set in mesh with its planet gears 28 as shown for maintaining the low-speed ratio. A relatively heavy coil spring 50 acts through a thrust bearing 52 to shift the output member 18, thereby to engage the high-speed sun gear 22 with its planet gears 30 whenever the governor weights 29 move out far enough to separate the contact member 44 from the contact members 46 and 48 and thereby de-energize the electromagnet 36. For purposes of illustration only, the governor may be arranged to break the electric circuit through the electromagnet at 2,000 R. P. M. of the driving member 14.

Surrounding and integral with the internally toothed ring gear 32 of the low-speed gear set is an externally toothed worm wheel 54 with which a worm 56 is permanently meshed. Worm 56 is supported in bearings 58 carried by the housing 10 and is hollow, whereby a cooling medium may be pumped or otherwise forced through the bearings and the worm. The interior of the hollow worm may be fluted as at 60 or it may be threaded, splined, or otherwise roughened to retard passage of the coolant for a purpose which will hereinafter be more fully understood when the operation of the invention is explained. A disc 59 on the rear bearing 58 and a like disc 61 on the worm 56 (see Fig. 6) are held in frictional engagement, one with the other, by the reaction of the ring gear 32 through the worm wheel 54 and worm 56 when the low-speed planetary gear set is operating. In the embodiment of the invention herein shown, the worm wheel 54 has 130 teeth and the worm 56 is double-threaded, thereby providing a wheel-to-worm ratio of 65 to 1.

Surrounding and integral with the internally toothed ring gear 34 of the high-speed gear set is an externally toothed worm wheel 62 with which a worm 64 is permanently meshed. Worm 64 is supported in bearings 66 and is hollow and internally roughened to retard passage of a coolant, hereinafter more fully explained. Discs 59 and 61 are provided as and for the purpose above explained relative to Fig. 6. The worm wheel 62 has 96 teeth and the worm is double-threaded, thereby providing a wheel-to-worm ratio of 48 to 1.

Carried on the input member 14 is a sun gear 68 which is of wide enough face to engage two planet pinions 70 and 72. Planet pinions 70 and 72 are rotatable on planet shafts 73 and 75 which extend laterally from the sides of planet rings 74 and 76 respectively. Rings 74 and 76 are rotatable on bearings 78 carried on the input member 14 and both have external gear teeth whereby they serve both as gears and as carriers for revolving the planet gears 70 and 72. Planet carrier ring 74 has 80 teeth and planet carrier ring 76 has 90 teeth. Ring gears 80 and 82, having both internal and external teeth, surround planet pinions 70 and 72, respectively, the internal teeth being in mesh with the teeth of the planet pinions. Ring gear 80 has 80 internal and 120 external teeth while ring gear 82 has 80 internal and 180 external teeth.

A small high-speed control motor 84, which may also be referred to as a reference motor, is supported on the housing 10 and carries a 15-toothed pinion 86 on the outer end of its rotor shaft. An integral gear and pinion 88 and 90 having 75 and 20 teeth respectively, rotate on the stud 92 and drivably connect the control motor pinion 86 to the external teeth of the ring gear 80. A second control motor pinion 94 also having 15 teeth is connected to the external teeth of the ring gear 82 through an idler 83. The control motor 84 should be variable in speed, but capable of remaining constant at any speed to which it is set. For purposes of illustration only, the control motor 84 may in the instant embodiment of the invention be assumed to have been set to rotate anticlockwise and have a constant speed of 12,000 R. P. M., whereby, with the gearing shown, the ring gear 80 will have a constant speed of 400 R. P. M. and ring gear 82, a constant speed of 1000 R. P. M., both anticlockwise and both irrespective of the speed of the input member 14.

A bracket 95 depends from the top of the housing 10 for supporting a train of gears which connect the planet carrying gear 74 to the worm 56 of the low-speed gear set. This train comprises a pinion 92 with eight teeth, gear 94 with 40 teeth, pinion 96 with 8 teeth, gear 98 with 45 teeth, pinion 100 with 10 teeth, bevel gear 102 with 40 teeth, and bevel gear 104 also having 40 teeth. This train, together with the carrier gear 74, pinions 70 and ring 80 may be called the low-speed control gearing and may collectively be designated by the numeral 107.

Pinion 92 and gear 94 are joined to rotate as one on the stud 106. Pinion 96 and gear 98 are both fast on and rotatable with the shaft 108 which has bearing in the bracket 95. Pinion 100 and bevel gear 102 are joined to rotate as one on the stud 110 which is fixed in the bracket 95. The bevel gear 104 may be secured to or be integral with the worm 56. The ratio of planet pinion carrier gear 74 to worm wheel 54 is 1 to 3⁶⁵⁄₁₃.

Another bracket 105 depends from the top of the housing 10 for supporting a train of gears which connect the planet carrying gear 76 to the worm 64 of the high-speed gear set. This train comprises a pinion 112 having 10 teeth, a gear 114 having 40 teeth, pinion 116 having 10 teeth, gear 118 having 60 teeth, pinion 120 having 10 teeth, bevel gear 122 having 40 teeth, and bevel gear 124 also having 40 teeth. This train, together with the carrier gear 76, pinions 72 and ring 82 may be called the high-speed control gearing and may collectively be designated by the numeral 125.

Pinion 112 and gear 114 are joined to rotate as one on the stud 126. Pinion 116 and gear 118 are both fast on and rotatable with the shaft 128 which has bearing in the bracket 105. Pinion 120 and bevel gear 122 are joined to rotate as one on the stud 130 which is fixed in the bracket 105. The bevel gear 124 may be secured to or be integral with the worm 64. The ratio of planet pinion carrier gear 76 to worm wheel 62 is 1 to 4½.

The operation of the device is as follows:

*Operation*

Let it be assumed for purposes of illustration that the exemplification of the invention herein shown and described is being used on an aircraft; that a 50 H. P. generator attached to the output member 18 must be kept at a constant speed of 6000 R. P. M. at all speeds of the input member 14; that the input member 14 is drivably attached to the engine of the aircraft; that said engine may revolve as slow as 800 R. P. M. when the craft is being taxied, as fast as 2700 R. P. M. at take-off and preferably at about 2000 R. P. M. when cruising which is the greater portion of the time; and that the small reference motor 84 is of quarter horsepower capacity and maintains an exact constant speed of 12,000 R. P. M. The input member 14 and output member 18 may, for illustrative purposes be taken to revolve clockwise when viewed from right to left of Fig. 1. When the term "clockwise" is used with reference to other rotating parts, they may also be assumed to be viewed from right to left of Fig. 1.

If the engine is now operated at 800 R. P. M., the governor 38 will have the electrical contacts 46 and 48 connected through the contact 44, whereby the electromagnet 36 will be energized, and the output member 18 will be shifted to the righthand position, i. e., the high-speed sun gear 22 will be out of mesh with its planet pinions 30, and the sun gear 20 will be in mesh with its planet gears 28 as seen in Fig. 1.

With the sun gear 68 being revolved at a speed of 800 R. P. M. by the input member 14, and the ring gear 80 being revolved at a speed of 400 R. P. M. by the control motor 84, the planet pinion 70 will be rotating on its planet shaft 73, but will not be revolving around the axis of the sun gear 68. The planet carrier 74 therefore remains nonrotative, whereby that part of the low-speed control gearing which connects the carrier gear 74 to the worm 56, together with the worm and worm wheel 56 and 54 will all be nonrotative which is a condition precedent to the low-speed planetary gear set 33, i. e., the sun 20, planets 28 and ring 32, operating at a driver-to-driven ratio of 1 to 7½ as hereinbefore stated.

As soon, however, as the input member 14 rotates the sun gear 68 at any speed above 800 R. P. M., the planet carrier gear 74 rotates clockwise in direct proportion to the excess of driver revs. over 800 R. P. M., whereby the ring gear 54 through that part of the control gearing 107 which connects it to the carrier gear 74 is rotated clockwise, an amount which reduces the ratio of the low-speed gear set 33, from 1 to 7½ driver-to-driven to whatever ratio is necessary to maintain a speed of 6000 R. P. M. of the output member 18.

As an illustrative example of the above condition, assume that the speed of the input member 14 has been raised from 800 to 1000 R. P. M. The ring gear 80 being driven by the control motor 84 continues to revolve at a speed of 400 R. P. M. The ring gear 80 has 80 internal teeth while the sun gear 68 has 40 external teeth. With the ring gear 80 and sun gear 68 both revolving at different speeds and in opposite directions, the planet pinion carrier gear 74 will revolve in accordance with the following equation:

1 rev. of the sun gear 68 =

$$\frac{S}{R+S} - X \frac{R}{R+S} \text{ revs.}$$

of the carrier gear 74 wherein

S = number of teeth on the sun gear 68 = 40
R = number of internal teeth on the ring gear 80 = 80

$$X = \frac{\text{revs. of slow driver}}{\text{revs. of fast driver}} = \frac{400}{1000}$$

substituting, 1 rev. of the sun gear 68 =

$$\frac{40}{80+40} - \frac{400}{1000} \times \frac{80}{80+40} = \frac{1}{15} \text{ rev.}$$

of the carrier gear 74.

At 1000 R. P. M. of the sun gear 68 the carrier gear 74 revolves 1000 × 1/15 = 66⅔ R. P. M.

Since the ratio of the carrier gear 74 to the slow speed main ring gear is 1 to 3⁶/₁₃, the ring gear 32, during the 1000 revs. of the input member 14 will have revolved 3⁶/₁₃ × 66⅔ = 230¹⁰/₁₃ revs.

With the carrier arms 24 on the input member revolving 1000 R. P. M., and the ring gear 32 revolving 230¹⁰/₁₃ R. P. M., both in the same direction, the sun pinion 20 will revolve in accordance with the following equation:

1 rev. of the carrier arms 24 =

$$\frac{R+S}{S} - X \frac{R}{S} \text{ revs.}$$

of the sun pinion 20, wherein
S = number of teeth on the sun pinion 20 = 20
R = number of teeth on the ring gear 32 = 130

$$X = \frac{\text{revs. of slow driver}}{\text{revs. of fast driver}} = \frac{230^{10}/_{13}}{1000}$$

substituting, 1 rev. of the carrier arms 24 =

$$\frac{130+20}{20} - \frac{230^{10}/_{13}}{1000} \times \frac{130}{20} = 6 \text{ revs.}$$

of the sun pinion 20.

At 1000 R. P. M. of the carrier arms 24, the sun pinion 20 will rotate at a speed of 6000 R. P. M.

Thus far it has been shown that whether the input member rotated 800 R. P. M. or 1000 R. P. M., the output member in either case rotated 6000 R. P. M., it being assumed of course, that the control motor 84 continued to rotate at the constant speed of 12,000 R. P. M. to which it was set in both cases. By the same procedure in calculation, it may be shown that no matter at what speed the input member rotates, the output member will continue to rotate at 6000 R. P. M. as long as the control motor rotates 12,000 R. P. M.

While the low-speed gear set 33 was in operation as above described, the high-speed gear set 35 was also revolving but without load. Since the ring gear 82 was being kept at a constant speed of 1000 R. P. M., the sun gear 68 was consequently rotated by the input member 14 at a speed of 2000 R. P. M. to allow the planet pinion carrier gear 76 to become nonrotative. At 2000 R. P. M. of the input member, therefore, the ring gear 34 of the high-speed gear set 35 and those of the control gearing 125 which connect it to the carrier gear 76, became nonrotative, and it is at this speed that the governor 38 acts to shift the load to the high-speed gear set as hereinbefore described.

It should be understood, however, that the output member 18 may be shifted axially from one of its positions to the other at any speed of the input member, or it may be shifted to any position intermediate its two positions where both sun gears are partly engaged with their respective planets, since the relative speed of either sun gear 20 or 22 and its planets 28 or 30 is always the same at any speed and in any position to which the output member may be shifted, whereby shifting is always accomplished without gear clash.

As hereinbefore stated, the ratio of the high-speed gear set 35 is 1 to 3 driver-to-driven revs. when the ring gear 34 is nonrotative, which is at 2000 input revs. Since the input speed upon take-off may be as much as 2700 R. P. M., the high-speed control gearing 125 must, at speeds over 2000 R. P. M. slip off the extra 700 revs. That it will do this may be shown by example as follows:

1 rev. of the sun gear 68=

$$\frac{S}{R+S} - X\frac{R}{R+S} \text{ revs.}$$

of the carrier gear 76, wherein

S=number of teeth on the sun gear 68=40.
R=number of internal teeth on the ring gear 82=80.

$$X = \frac{\text{revs. of slow driver}}{\text{revs. of fast driver}} = \frac{1000}{2700}$$

substituting,
1 rev. of the sun gear 68=

$$\frac{40}{80+40} - \frac{1000}{2700} \times \frac{80}{80+40} = \frac{7}{81} \text{ revs.}$$

of carrier gear 76.

At 2700 revs. of sun gear 68, the carrier gear 74 revolves $2700 \times 7/81 = 233\frac{1}{3}$ R. P. M.

Since the ratio of the carrier gear 76 to the high speed main ring gear is 1 to 4½, the ring gear 34, during the 2700 revs. of the input member 14, will have revolved $4\frac{1}{2} \times 233\frac{1}{3} = 1050$ revs.

With the carrier arms 26 on the input member revolving 2700 R. P. M. and the ring gear 34 revolving 1050 R. P. M., both in the same direction, the sun gear 22 will revolve in accordance with the following equation:

1 rev. of carrier arms 26=

$$\frac{R+S}{S} - X\frac{R}{S} \text{ revs.}$$

of sun gear 22, wherein
S=number of teeth on the sun gear 22=40.
R=number of teeth on the ring gear 34=80.

$$X = \frac{\text{revs. of slow driver}}{\text{revs. of fast driver}} = \frac{1050}{2700}$$

substituting,
1 rev. of the carrier arms 26=

$$\frac{80+40}{40} - \frac{1050}{2700} \times \frac{80}{40} = 2\frac{2}{9} \text{ revs.}$$

of sun gear 22.

At 2700 R. P. M. of the carrier arms 26, the sun gear 22 will rotate $2700 \times 2\frac{2}{9} = 6000$ R. P. M.

The following example will serve to illustrate that a shift from the low-speed to the high-speed gear set or vice versa may be made without clash or that both gear sets may be half in and half out of mesh and still operate satisfactorily.

Assume that purposely or inadvertently at 1500 R. P. M. the output member 18 is shifted to a point where the sun pinion 20 and the sun gear 22 are both half way in mesh. As before shown, at any speed of the input member, the output member will be rotating 6000 R. P. M.

Clockwise rotation of the ring gear 32 will then be determined by the following equation:

In the low-speed gear set 33, 1 rev. of fast driver S=

$$X\frac{R+S}{R} - \frac{S}{R} \text{ revs. of driven member R}$$

wherein

C=slow driver rotating 1500 R. P. M.
S=fast driver rotating 6000 R. P. M. and having 20 teeth.
R=ring gear=driven member=130 teeth.

$$X = \frac{\text{revs. of slow driver}}{\text{revs. of fast driver}} = \frac{1500}{6000}$$

substituting,
1 rev. of fast driver S=

$$\frac{1500}{6000} \times \frac{150}{130} - \frac{20}{130} \text{ revs. of driven member R}$$

1 rev. of fast driver S=$7/52$ rev. of R.
6000 revs. of S=

$$\frac{10,500}{13} = 807\frac{9}{13} \text{ revs. of R}$$

Since the ratio between ring gear 32 and planet pinion carrier gear 74 has hereinbefore been shown to be $3\frac{6}{13}$ to 1, the carrier gear 74 will be rotating $807\frac{9}{13} \div 3\frac{6}{13} = 233\frac{1}{3}$ R. P. M.

Since the carrier gear 74 is rotating 233⅓ R. P. M. and the sun gear 68 is rotating 1500 R. P. M. the speed of the ring gear 80 may be determined as follows:

1 rev. of fast driver S=

$$X\frac{R+S}{R} - \frac{S}{R} \text{ revs.}$$

of driven member R, wherein

C, the carrier gear 74=slow driver rotating 233⅓ R. P. M.
S, the sun gear 68=fast driver rotating 1500 R. P. M. and having 40 teeth.
R, the ring gear 80=driven member having 80 internal teeth.

$$X = \frac{\text{revs. of slow driver}}{\text{revs. of fast driver}} = \frac{233\frac{1}{3}}{1500}$$

substituting,
1 rev. of fast driver S=

$$\frac{233\frac{1}{3}}{1500} \times \frac{80+40}{80} = -\frac{4}{15} \text{ turn}$$

1500 revs. of fast driver $S = 1500 \times -\frac{4}{15} = -400$ or 400 turns anticlockwise, which is the speed and direction of the ring gear 80 now being maintained constant by the control motor 84.

The above calculation shows that, in the low-speed gear set, if the input member is revolved at a speed of 1500 R. P. M. and the output member in the same time also is revolved at a speed of 6000 R. P. M., the gear 80 will be revolved at a speed of 400 R. P. M. even if the motor 84 should be disconnected therefrom. The same calculation will now be applied to the high-speed gear set. In the high-speed gear set 35, 1 rev. of fast driver S =

$$X\frac{R+S}{R} - \frac{S}{R} \text{ revs.}$$

of driven member R, wherein

C is the slow driver rotating 1500 R. P. M.
S is the fast driver rotating 6000 R. P. M.
R=driven member=ring gear=80 teeth $$X = \frac{\text{revs. of slow driver}}{\text{revs. of fast driver}} = \frac{1500}{6000}$$

substituting,
1 rev. of fast driver S=

$$\frac{1500}{6000} \times \frac{80+40}{80} - \frac{40}{80} = -\frac{1}{8}$$

1 rev. of fast driver S= −⅛ rev. of R.
6000 revs. of S=6000× −⅛=−750 revs. of R.,
i. e., 750 revs. in an anticlockwise direction.

Since the ratio between ring gear 34 and planet pinion carrier gear 76 is 4½ to 1, the carrier gear 76 will be rotating 750÷4½=166⅔ R. P. M.

Since the carrier gear 76 is rotating 166⅔ R. P. M. and the sun gear 68 is rotating 1500 R. P. M., the speed of the ring gear 82 may be determined as follows:

1 rev. of fast driver S=

$$X\frac{R+S}{R} + \frac{S}{R} \text{ revs.}$$

of driven member R, wherein

C, the carrier gear 76=slow driver rotating 166⅔ R. P. M.
S, the sun gear 68=fast driver rotating 1500 R. P. M.=40 teeth.
R, the ring gear 82=driven member having 80 internal teeth.

$$X = \frac{\text{revs. of slow driver}}{\text{revs. of fast driver}} = \frac{166\frac{2}{3}}{1500}$$

substituting,
1 rev. of fast driver S=

$$\frac{166\frac{2}{3}}{1500} \times \frac{80+40}{80} + \frac{40}{80} = \frac{2}{3}$$

1500 revs. of fast driver S=1500×⅔=1000, i. e., 1000 turns anticlockwise, which is the speed and direction of the ring gear 82 maintained by the control motor 84.

From the foregoing, it will be seen that if the speed of the control gear 80 is held at exactly 12,000 R. P. M., the output member 18 will maintain a constant speed of 6000 R. P. M. irrespective of the speed of the input member. In view of this fact it is obvious that if it becomes desirable to vary the speed of the output member, it can readily be done by merely varying the speed of the control motor 84 whereby the speed of the output member will vary in direct proportion to the variation of the control motor speed irrespective of the speed of the input member.

It is noted that the low-speed gear set 33 is so constructed that the main ring gear 32 and the control gearing 107 are all nonrotative at 800 R. P. M. but that they increase in speed as the speed of the input member goes up. The higher the input member speed the higher the speed of the control gearing must be to maintain the same output member speed.

It is for this reason that the range which may be covered by a single gear set is preferably limited in order to hold the speed of the control gearing, particularly the worm 56 within reasonable bounds. In the embodiment herein shown, the low-speed gear set covers a range of ratios from a low of 800-to-6000 driver-to-driven to a high of 2000-to-6000 driver-to-driven before the governor acts to relieve the fast rotating worm 56 of its duty by transferring the load to the high-speed gear set which starts with a ratio of 2000-to-6000 driver-to-driven at which ratio its control gearing 125 is nonrotative.

It is therefore obvious that the higher the efficiency that is demanded of the invention the more restricted should be the range of ratios which a single gear set should be made to cover. Where a considerable total speed range is to be covered, more than two gear sets may preferably be used each with its attendant control gearing. By thus employing a greater number of gear sets with means for transferring the load from one to the next, the worm and wheel gearing is not over-speeded, and since the speed of the gearing being disengaged in the transfer of the load is exactly equal to the speed of the gearing being engaged, a smooth and unnoticeable transfer is provided.

It should also be noted that the design of the worm and worm wheel of a gear set should be such that the friction between the worm and the wheel teeth together with the friction between the discs 59 and 61 (see Fig. 6) and such bearing friction as may exist will make the worm just self-locking but near enough reversible that the slightest power applied by the control motor 84 will start rotation of the worm and its attendant control gearing and maintain rotation at a speed always commensurate with the changing relation between the input and output speeds.

The cooling of the worms 56 and 64 is an important feature of the invention. Since the speed of the worm gearing varies over a wide range, depending on the range of ratios which a single gear set is to cover, the coefficient of friction will also vary, being, let us say, .1 at the lowest speed at which the worm rotates to .01 at the highest speed at which it rotates, thereby imposing a variable load on the control motor which may affect its synchronism.

In order to counteract the effect of this variable coefficient of friction and at the same time provide means to effect transfer of the heat generated by the worm gearing, the worm and its bearings are constructed as described relative to Fig. 6. The restriction 60 to the flow of a coolant through the opening in the worm creates a torque which increases with the worm speed. Since the torque produced by the friction of the worm gearing decreases with the worm speed, the roughening or other restriction to flow within the worm is made such as to maintain an even balance between the decreasing torque created by the mechanical friction of the worm gearing and the increasing torque created by the flow of a cooling fluid through the restricted passage, whereby the control motor and control gearing carry only a minimum uniform load.

In order to maintain the temperature of the cooling medium relatively low and uniform, the circuit may include any suitable controllable heat transfer unit through which the collant leaving one end of the worm must pass before it may re-enter at the other end.

It will of course be understood that while, in the embodiment shown, the speed of the input is variable and that of the output is constant, the device may be adapted for a constant input and variable output. Moreover, while the device shown employs a mechanical input and electrical output, either or both input and output may be hydraulic, electric or mechanical.

Furthermore, while the device shown by way of an example includes two ratio changing units, either of those may be used singly if the range which they are to cover is not too great, or, when the overall ratio range is quite large, as many more ratio changing units as are required to cover the desired range may be employed.

While the device shown suggests the use of a single power input unit of variable speed, such as an aircraft engine driving a single power output unit of constant or controllable speed, such as a generator, it will be obvious that, if a series of devices, such as are herein shown, have their input members 14 thus coupled to power input units, and their output members 18 thus coupled to power output units, and synchronous control motors 84 are employed and connected in parallel to the same source of energy, such as the small inverter employed on aircraft, the output members 18 will not only each maintain a constant speed but all of the series will be kept at the same speed irrespective of variation in speed between one or another of the power input units.

Having thus described an embodiment of my invention, I claim:

1. A variable ratio gear mechanism which comprises two relatively rotatable members, a planetary gear set which includes a power transmitting sun gear fast on one of said members, a power transmitting planet gear on the other of said members and a power transmitting reaction gear, and planetary control gearing which includes a sun control gear fast on the said other of said members, a planet control gear drivably connected to the power transmitting reaction gear, a control reaction gear in mesh with said planet control gear and means to control said control reaction gear.

2. A planetary power transmitting gear set which includes a power transmitting sun gear, a power transmitting planet gear in mesh with said power transmitting sun gear, a power transmitting carrier for said power transmitting planet gear and a power transmitting reaction gear in mesh with said power transmitting planet gear, in combination with a planetary control gear set which includes a control sun gear, a control planet gear in mesh with said control sun gear, a control carrier for said control planet gear and a control reaction gear in mesh with said control planet gear, means drivably connecting said control carrier to said power transmitting reaction gear, and means for controlling the speed of said control reaction gear.

3. In combination, an input member, an output member, a control sun gear on the input member, a power transmitting sun gear on the output member, a control planet gear in mesh with the control sun gear, a power transmitting planet gear in mesh with the power transmitting sun gear, a control reaction gear in mesh with said control planet gear, a power transmitting reaction gear in mesh with said power transmitting planet gear, a carrier on said input member for said power transmitting planet gear, a carrier for said control planet pinion drivably connected to said power transmitting reaction gear, and means for controlling rotation of said control reaction gear.

4. The combination of an input member, an output member, a control sun gear on the input member, a power transmitting sun gear on the output member, a control planet gear in mesh with the control sun gear, a power transmitting planet gear in mesh with the power transmitting sun gear, a control reaction gear in mesh with said control planet gear, a power transmitting reaction gear having internal teeth in mesh with said power transmitting planet gear and external worm wheel teeth, a worm rotatably supported for engagement with said worm wheel teeth, a carrier on said input member for said power transmitting planet gear, a carrier for said control planet pinion drivably connected to said worm, and a power operated control means for controlling the speed of said control reaction gear.

5. The structure defined in claim 4, wherein the worm is hollow and adapted for the passage of a coolant therethrough.

6. The structure defined in claim 4, wherein the worm is hollow and adapted for the passage of a coolant therethrough, and wherein the hollow of the worm is roughened in order that said passage of coolant will create a resisting torque which increases with increase in worm speed.

7. In combination, a power source, an input member drivably connected to said power source, an output member, a plurality of control sun gears on the input member, a plurality of power transmitting sun gears axially spaced on the output member, a plurality of control planet gears each in mesh with their control sun gears, a plurality of power transmitting planet gears each adapted to be engaged with their power transmitting sun gears one sun gear at a time, a plurality of control reaction gears in mesh with said control planet gears, a plurality of power transmitting reaction gears in mesh with said power transmitting planet gears, a plurality of carriers on said input member for said power transmitting planet gears, a plurality of carriers for said control planet pinions drivably connected to said power transmitting reaction gears, control means, operable by a power source which is independent of the first power source, for rotating said control reaction gears at a selected speed, but each at a different speed, and means operative at a predetermined speed to shift one of said power transmitting sun gears out of mesh with its planet gear and another of said power transmitting sun gears into mesh with its planet gear.

8. The structure of claim 7, wherein the last said means is an electromagnet.

9. The structure defined in claim 7, wherein the last said means is an electromagnet with a speed responsive governor adapted at predetermined speeds to energize or de-energize said electromagnet.

10. In a power transmitting mechanism, two relatively rotatable members, a planetary power transmitting gear-set having an element fast on each of said members and an element serving as a power transmitting reaction element, a planetary control gear-set having a control element fast on one of said members, a second control element, power transmitting means of fixed ratio connecting the second control element to the reaction element of the power transmitting gear-set, and a third element acting as a control reaction element, a source of rotatable power apart from said members, and power transmitting means of fixed ratio connecting said source of rotatable power to said control reaction element.

11. In a power transmitting mechanism, two relatively rotatable members, a three-element planetary power transmitting gear-set having one element fast on each of said members and a third element serving as a power transmitting reaction element, a three-element planetary control gear-set having a control element fast on one of said members, a second control element, a train of toothed gearing connecting the second control element to the reaction element of the power transmitting gear-set, and the third control element acting as a control reaction element, a source of rotatable power apart from said members, and a train of toothed gearing connecting said source of rotatable power to said control reaction gear.

12. In a power transmitting mechanism, two relatively rotatable members, a planetary power transmitting gear-set comprising a pinion carrier and its pinion and two gears both in mesh with said pinion, one gear being fast on one of said members, the said pinion carrier being fast on the other of said members, and the other gear acting as a power transmitting reaction gear, a planetary control gear-set comprising a pinion carrier and its pinion, and two gears both in mesh with said pinion, one of said gears being fast on one of said members, power transmitting means of fixed ratio connecting the carrier of the control gear-set to the reaction gear of the power transmitting gear-set, and the other gear of the control gear-set acting as a control reaction gear, a source of rotatable power of constant speed apart from said members, and power transmitting means of fixed ratio connecting said source of rotatable power of constant speed to said control reaction gear.

13. In a power transmitting mechanism, an input member, an output member, a planetary power transmitting gear-set comprising sun and ring gears, a planet pinion and a planet pinion carrier, one of said gears being fast on said output member, the carrier being fast on the input member, the pinion being rotatable on the carrier and in mesh with both gears, and the other gear acting as a power transmitting reaction gear, a planetary control gear-set comprising control sun and ring gears, and a control planet pinion and its carrier, one of the gears being fast on the input member, toothed gearing of fixed ratio connecting the control carrier to the power transmitting reaction gear, and the other gear serving as a control reaction gear, a source of constant speed rotatable power apart from said members, and power transmitting means of fixed ratio connecting said source of rotatable power to said control reaction gear.

14. In a power transmitting mechanism, an input member, an output member, a planetary power transmitting gear-set comprising sun and ring gears, a planet pinion and a planet pinion carrier, the sun gear being fast on said output member, the carrier being fast on the input member, the pinion being rotatable on the carrier and in mesh with both gears, and the ring gear acting as a power transmitting reaction gear, a planetary control gear-set comprising control sun and ring gears, and a control planet pinion and its carrier, the control sun gear being fast on the input member, toothed gearing of fixed ratio connecting the control carrier to the power transmitting reaction gear, and the ring gear of the control gear-set serving as a control reaction gear, a source of constant speed rotatable power apart from said members, and power transmitting means of fixed ratio connecting said source of rotatable power to said control reaction gear.

JOSEPH H. EGY.

REFERENCES CITED

The following references are of record in the file of this patent:

UNITED STATES PATENTS

| Number | Name | Date |
|---|---|---|
| 548,860 | Ames | Oct. 29, 1895 |
| 899,974 | Harter | Sept. 29, 1908 |
| 1,559,975 | Murray | Nov. 3, 1925 |
| 1,658,673 | Fontaine | Feb. 7, 1928 |
| 2,363,201 | Popoff | Nov. 21, 1944 |